United States Patent [19]

Cho

[11] Patent Number: 4,741,358
[45] Date of Patent: May 3, 1988

[54] LIQUID LEVEL CONTROL FLOAT VALVE

[76] Inventor: Jin S. Cho, P.O. Box 426, 600 Pusan, Rep. of Korea

[21] Appl. No.: 914,066

[22] Filed: Oct. 1, 1986

[51] Int. Cl.⁴ .................... F16K 31/32; F16K 33/00
[52] U.S. Cl. .................... 137/426; 137/429; 137/446; 137/447; 251/249.5; 251/250.5
[58] Field of Search ............ 137/426, 429, 430, 446, 137/447, 434; 251/248, 249.5, 250.5

[56] References Cited

U.S. PATENT DOCUMENTS

| | | | |
|---|---|---|---|
| 615,386 | 12/1898 | Gleason | 137/446 |
| 814,208 | 3/1906 | Hogan | 137/426 |
| 1,188,535 | 6/1916 | Ellis | 137/426 |
| 1,188,609 | 6/1916 | Beer et al. | 137/426 |
| 1,242,488 | 10/1917 | Spielman | 251/250.5 |
| 1,522,327 | 1/1925 | Ridenour | 137/447 |
| 2,263,494 | 11/1941 | Hagerty | 137/446 |
| 2,349,727 | 5/1944 | Hopkins | 137/249.5 |
| 3,369,560 | 2/1968 | Young | 137/446 |
| 3,394,632 | 7/1968 | Priese | 251/58 |
| 4,399,835 | 8/1983 | Holderith | 137/426 |

Primary Examiner—George L. Walton
Attorney, Agent, or Firm—Birch, Stewart, Kolasch & Birch

[57] ABSTRACT

A liquid level control float valve which comprises a valve body, an open/close valve disposed in the valve body, the open/close valve being mounted on a gear shaft which extends from the inside of the valve body to the outside of the valve body and on opposite sides thereof, engaging members fixed to the gear shaft on opposite sides of the valve body, passive gears rotatably engaged with the gear shaft on opposite sides of the valve body and adapted to engage the engaging members after a selected portion of its rotation has taken place, driving gears mounted for rotational engagement with the passive gears, a float ball provide to determine the liquid level, and lever arms connected at one end to the float ball and at the other end to the driving gears whereby upon the change in the level of the liquid, the float ball is raised or lowered which in turn rotates the driving gears and the passive gears engaged therewith which further rotates the gear shaft and correspondingly the open/close valve.

8 Claims, 20 Drawing Sheets

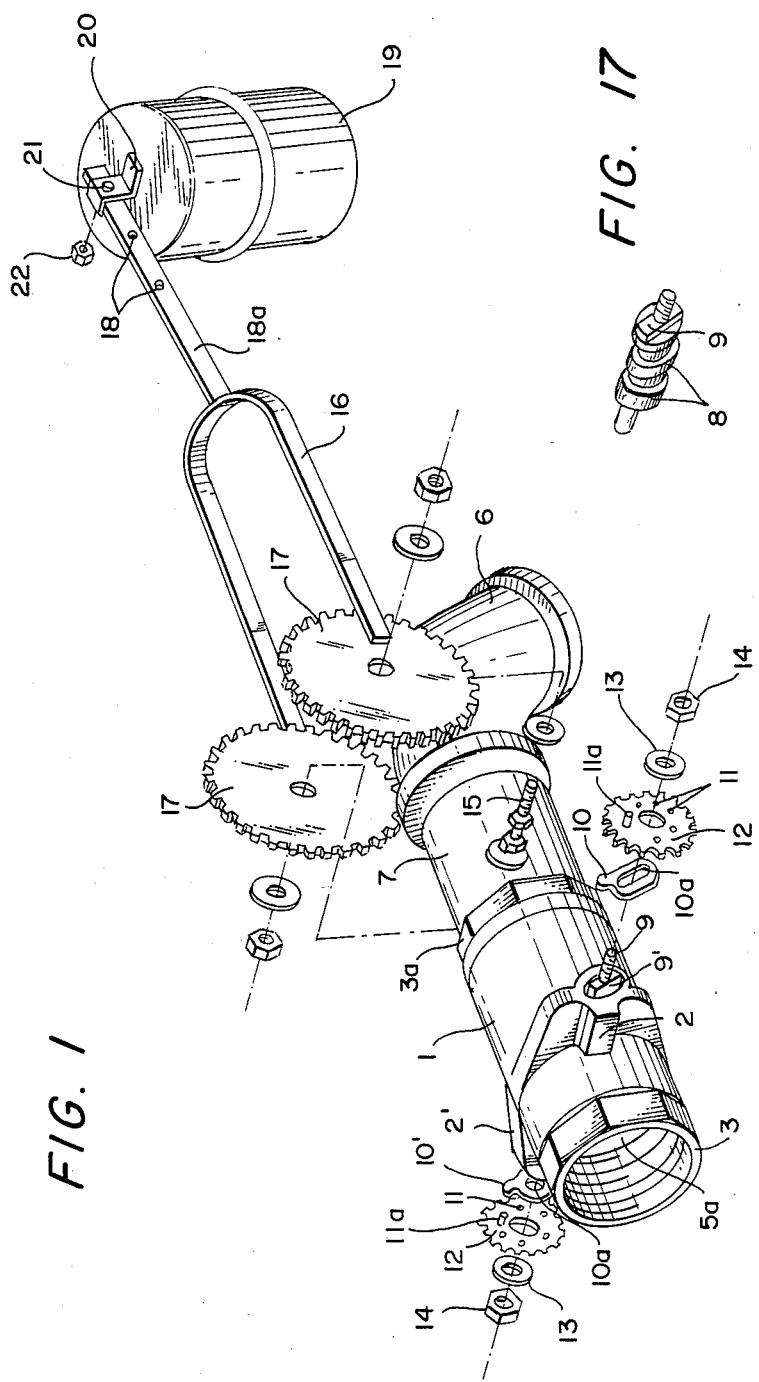

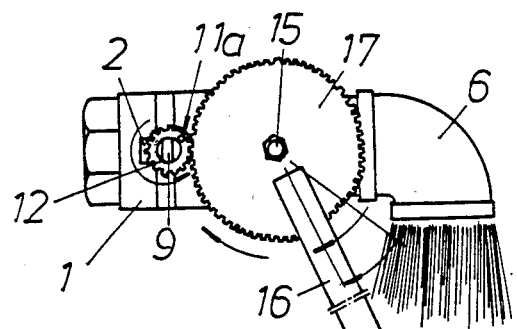
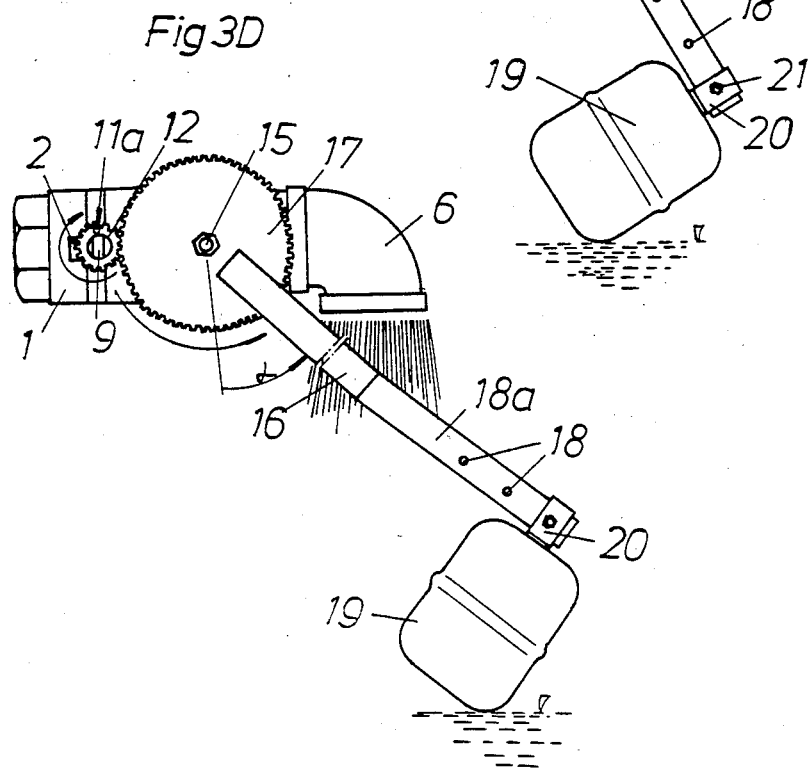

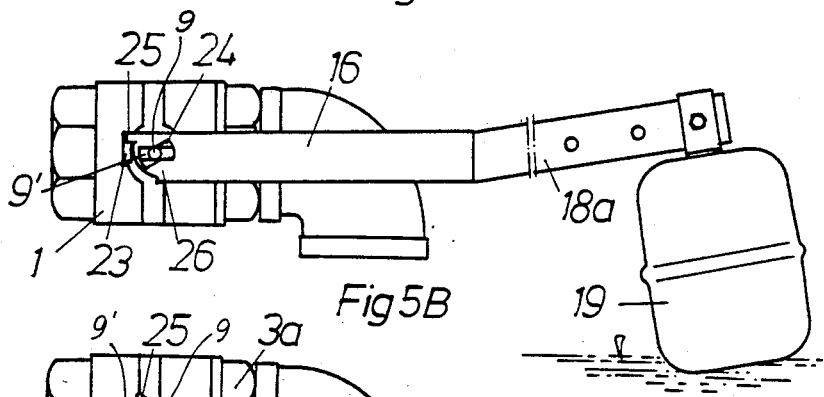
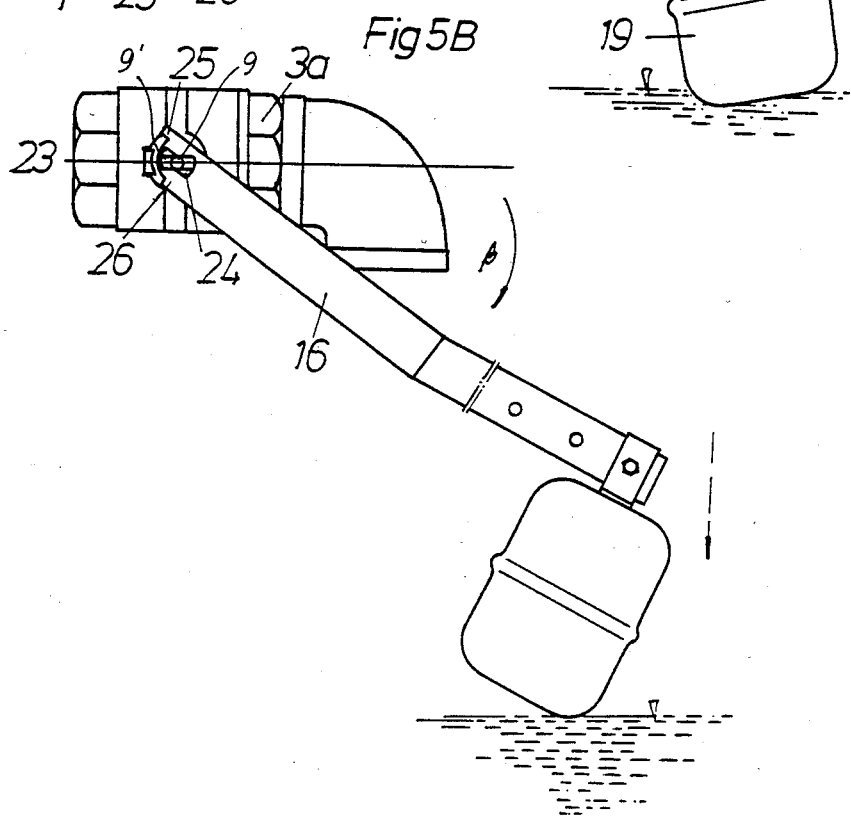

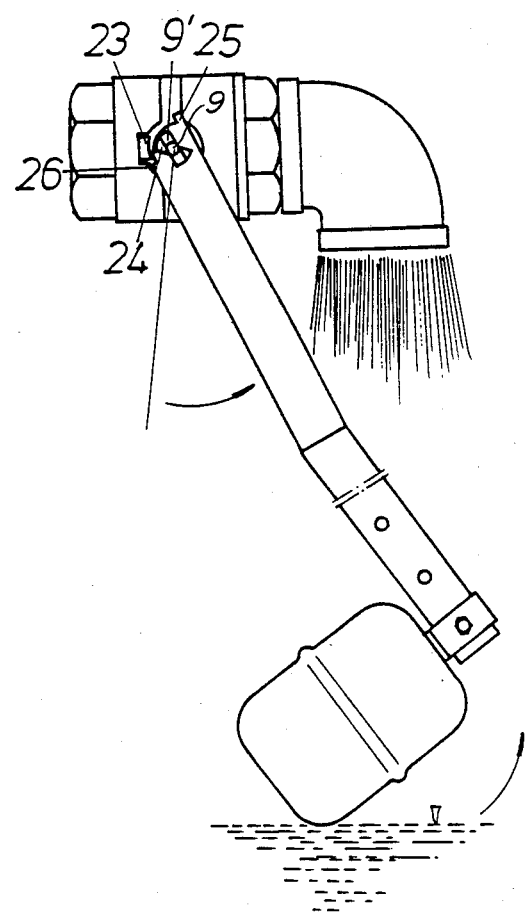

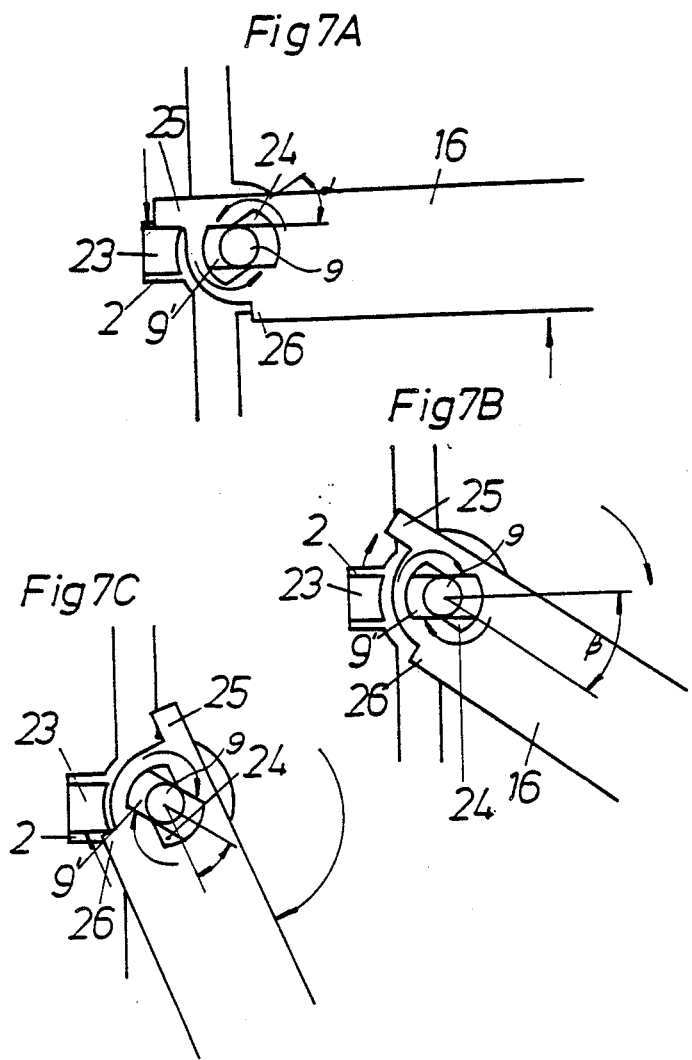

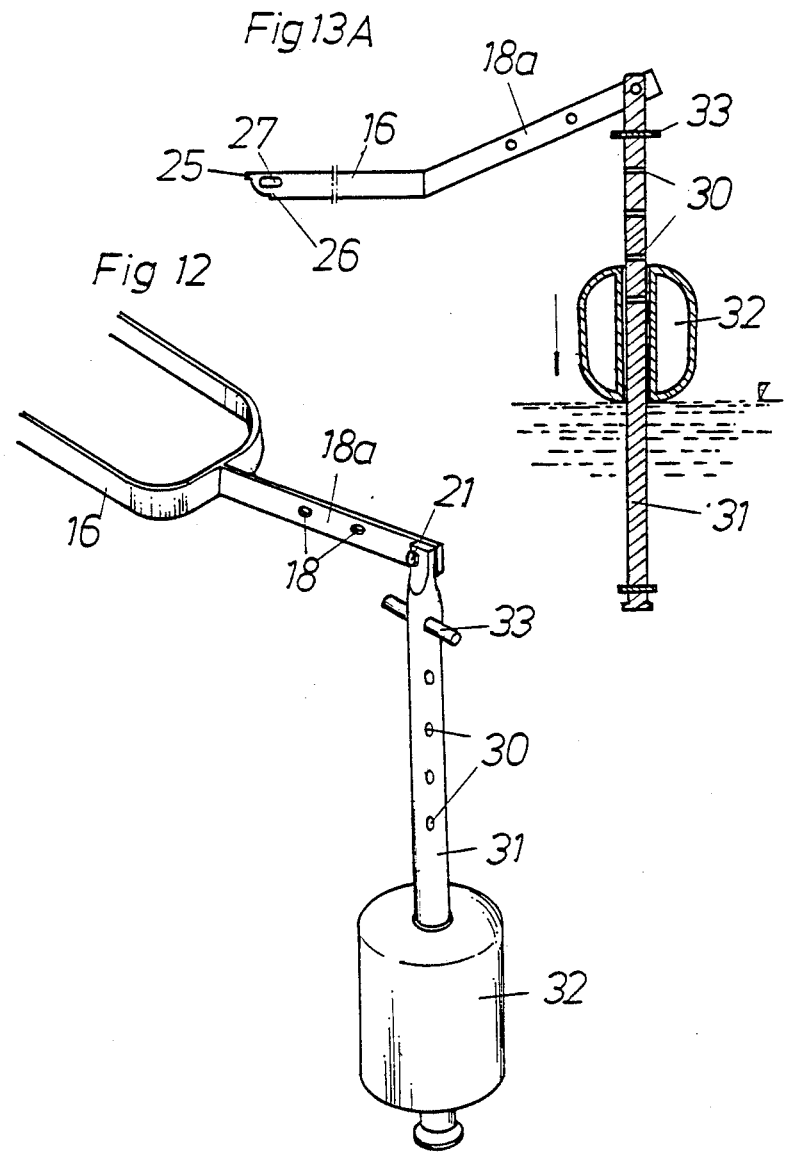

LIQUID LEVEL CONTROL FLOAT VALVE

BACKGROUND OF THE INVENTION

The present invention relates to a liquid level control float valve and more particularly to a liquid level control float valve for use in controlling the low and high liquid level for reserving a certain amount of liquid such as water, gasoline or the like in a low reservoir tank or a high reservoir tank installed in the buildings, apartments, factory buildings or the like.

There are many types of liquid control devices such as leveling valves, motorized valves or solenoid valves. However, these valves suffer from a number of disadvantages such as, for example, they need the power source to a reservoir tank attached thereto, and they cannot stop the fluid flow since the dregs collecting at the valves can prevent the valves from tightly closing.

Furthermore, it is conventional practice in the prior art to use a float ball tap as shown in FIGS. 15A and 15B. The float ball tap is structured for closing the fluid flow by the buoyancy action of a float ball mounted to the end of a lever which is attached to a plurality of hinges. However, the float ball tap suffers from a number of disadvantages such as, for example: (1) It is difficult to prevent the fluid for leaking into the valve seat when the pressure of the fluid flow through the conduit is higher than that of the valve causing the buoyancy action through the float ball; (2) The valve might be opened and a large volume of the fluid lost since a lever can be destroyed at the bending portion or connecting portion thereof with the float ball causing an increased buoyancy force; (3) The float ball tap must be frequently replaced; (4) Since the valve of the float ball tap is continuously actuated by the buoyancy action, the tensibility of the lever is gradually replaced; and (5) It is difficult for the float ball tap to control the fluid level when the ball tap is attached to the reservoir tanks located at locations with different heights, for example at the top of buildings with different heights.

OBJECTS AND SUMMARY OF THE INVENTION

Accordingly, it is an object of the present invention to provide an improved liquid level control float valve.

Another object of the present invention is to provide a liquid level control float valve which is structured for completely opening or closing a valve and the liquid flow associated therewith by the raising and lowering of a float ball.

A further object of the present invention is to provide a liquid level control float valve which is provided with a moving member which operatively engages with a means mounted to a lever connected to a ball top lever and a float ball.

Other objects and further scope of applicability of the resent invention will become apparent from the detailed description given hereinafter. It should be understood, however, that the detailed description, while indicating preferred embodiments of the invention, are given by way of illustration only, since various changes and modification within the spirit and scope of the invention will become apparent to those skilled in the art from this detailed description.

The present invention relates to a liquid level control float valve which comprises an open/close ball or a disk for opening or closing the liquid flow to a reservoir; a shaft connected to the open/close ball or disk; a U-type lever directly or indirectly connected to a shaft and a float ball, through a ball tap lever whereby the float valve controls the liquid level.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is an exploded perspective view of the liquid level control float valve of the present invention;

FIG. 3C diagrammatically shows the actuating system of the present invention wherein the lever is completely lowered due to the fluid being completely drained from the system and the valve is now placed in an open position;

FIG. 3D diagrammatically shows the actuating system of the present invention wherein the lever begins to rise and the valve is in an open position as the liquid starts to fill the reservoir;

FIG. 5A diagrammatically shows the embodiment of the actuating system of the present invention in which the lever is in a horizontal position when the liquid is completely filled in the reservoir tank;

FIG. 5D diagrammatically shows the embodiment of the actuating system of the present invention as shown in FIG. 5A wherein the lever begins to rise and the valve is still in an open position;

FIG. 7A diagrammatically shows the mechanical lever system of the present invention wherein the valve is in a close position;

FIG. 7B diagrammatically shows the mechanical lever system of the present invention wherein the valve is still in a close position;

FIG. 7C diagrammatically shows the mechanical lever system of the present invention wherein the valve is in an open position;

FIG. 12 is a perspective view of the embodiment of the ball tap portion of the present invention;

FIG. 13A is a sectional view of FIG. 12 showing diagrammatically the ball tap wherein the ball is in a moving position according to the level of the liquid under fixed lever thereof;

FIG. 17 is an exploded perspective view of the gear shaft of the present invention.

DETAILED DESCRIPTION OF THE INVENTION

Figure 2A:
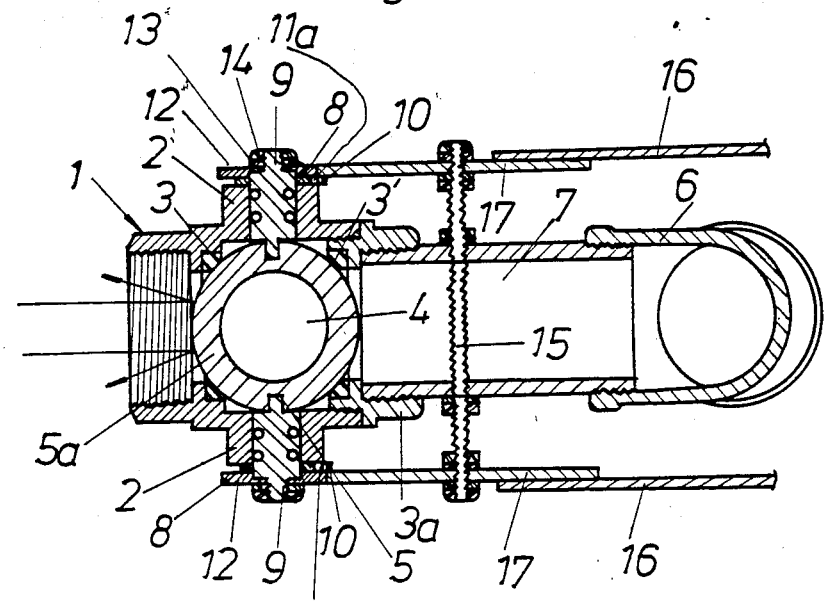
FIG. 2A is a sectional view of the float valve showing the valve in an open position.

Referring now in detail to the drawings for the purpose of illustrating the present invention, the liquid level control float valve of the present invention as shown FIG. 1 comprises a valve body 1 including a sheet tube 3a disposed therein which contains a sheet screw 3 disposed at one end and a connecting pipe 7 disposed at the other end thereof, an elbow pipe 6 connected to the connecting pipe 7, an U-shaped lever 16 provided with a pair of driving gears 17 which connect to the connecting pipe 7 through a shaft 15 mounted to the connecting pipe, and a ball tap lever 18a connected at one end to the U-shaped lever 16 and at the other end to a float ball 19 (FIG. 1).

The valve body 1 includes a gear shaft 9 which extends through the inside of the valve body to the outside thereof where it is provided, at opposite sides of the valve body with rectangularly configured studs 9' which are adapted to engage with similarly configured apertures of moving members 10a. Moving members 10a are provided with a projecting nipple 10 disposed on one side thereof. A passive gear 12 having a plurality of holes 11 and a fixed pin 11a is attached to the gear shaft by a washer 13 and a nut 14. Also, the gear shaft 9 contains a plurality of ring grooves 8 disposed thereon (FIG. 17). The passive gear 12 is geared to the driving gear 17 which in turn is connected to the U-shaped lever 16. An open/close valve 5a is inserted in the valve body 1 and includes a fluid flow hole 4 and a pair of peripheral slots 5 for receiving the gear shaft 9 thereinto (FIGS. 2 and 3). The ball tap lever 18a contains a plurality of adjusting holes 18 disposed thereon for adjusting the position of the float ball 19 on the lever utilizing a gasket 20, a bolt 21 and a nut 22.

Referring in detail to FIGS. 5A, 5B, 5C, 5D, 5E, 6, 7A, 7B, 7C, 7D, 7E, 8A and 8B, there is illustrated another embodiment of a clearance hole 24 or 27 in accordance with the present invention. The shaft inserting member 2 contains a stud 23 for tripping against a top raised portion 25 disposed at the top end of the U-shaped lever 16. The u-shaped lever 16 contains a lower raised portion 26 disposed at the lower end thereof and the clearance hole 24 or 27 disposed at one end thereof (FIGS. 6 and 8A).

Figure 11:
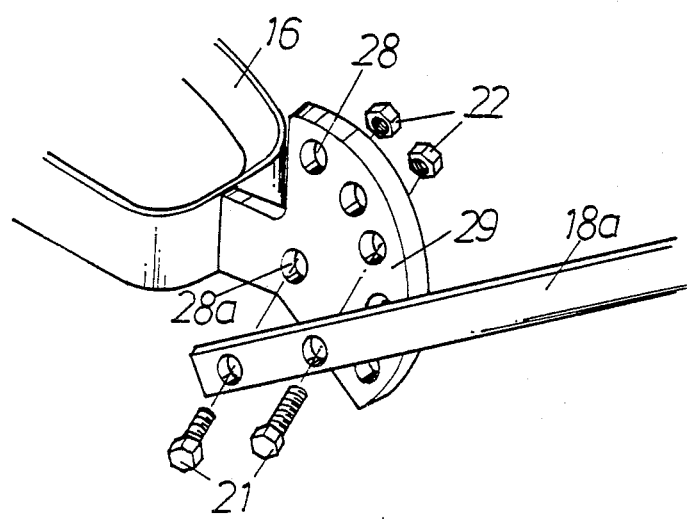
FIG. 11 is an exploded perspective view of FIG. 10.
Figure 13B:
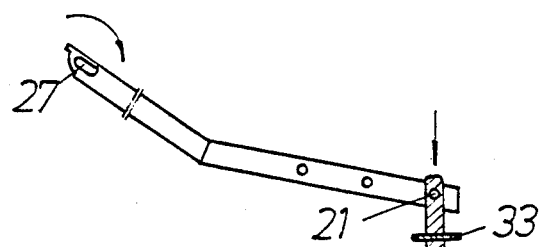
FIG. 13B is a sectional view of FIG. 12 showing diagrammatically the ball tap wherein the lever is in a moving position by the ball declining to the bottom of an axes thereof.
Figure 13C:
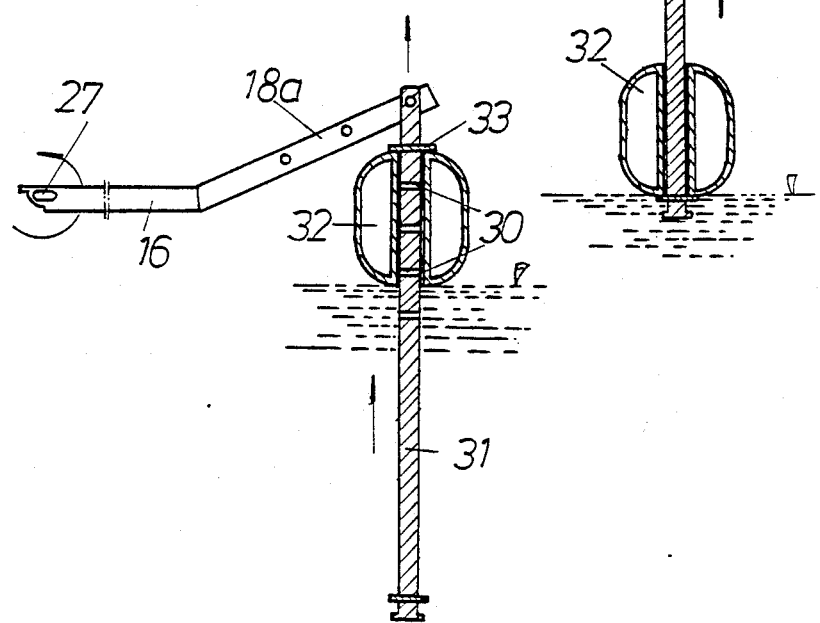
FIG. 13C is a sectional view of FIG. 12 showing diagrammatically the ball tap wherein the lever is in a moving position by the ball coming to the top of an axes thereof.

Referring in detail to FIG. 11, there is illustrated another further embodiment of the connecting portion between the U-shaped lever 16 and the ball tap lever 18a according to the present invention. The U-shaped lever 16 is connected to an angle control plate 29 which is a fan-type plate which contains a fixed central hole 28a and a plurality of angle control holes 28 disposed thereon (FIG. 11).

Referring in detail to FIGS. 12, 13A, 13B, 13C, 14A and 14B, there is illustrated a further additional embodiment of a disk 34 instead of the open/close valve 5a (FIG. 1) in accordance with the present invention. The float ball tap lever 18a is connected to a vertical rod 31 which is inserted into a sliding float ball 32. The vertical rod 31 includes a plurality of adjusting holes 30 for engaging a height adjustment pin 33 (FIG. 12).

According to the present invention, the liquid level control float valve operates as follows: When the liquid such as water or gasoline is drained, the U-shaped lever 16 is lowered in the direction indicated by the arrow from the horizontal position shown in FIG. 3A to the lower position shown in FIG. 3B. The driving gear 17 is simultaneously rotated in the direction indicated by the arrow due to the power of the float ball 19.

Figure 2B:
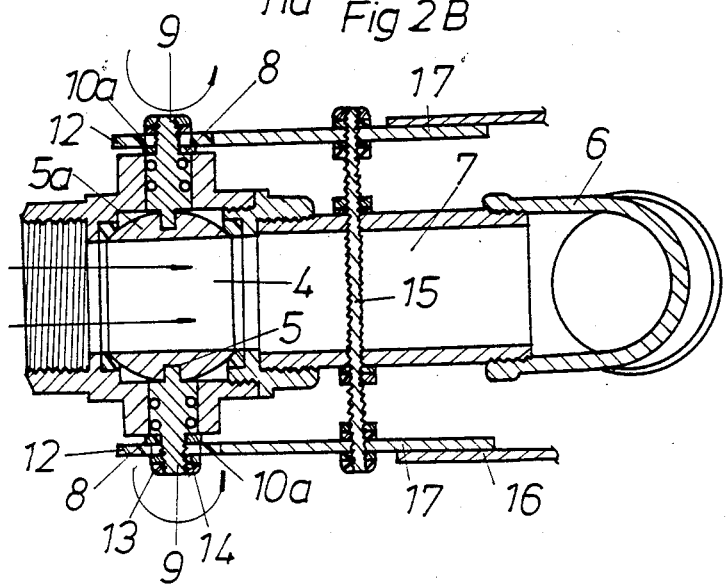
FIG. 2B is a sectional view of the float valve showing the valve in a closed position.
Figure 3A:
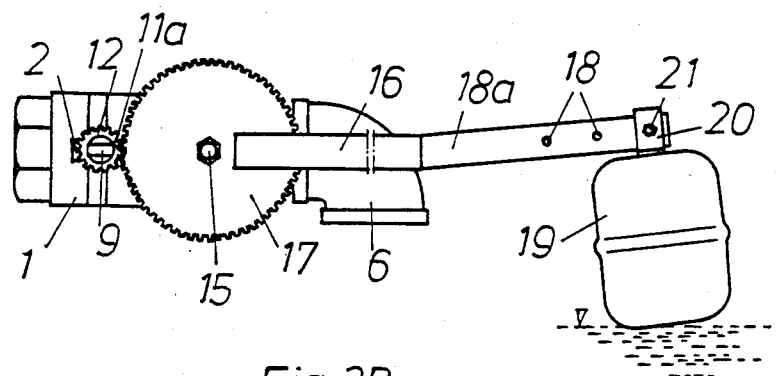
FIG. 3A diagrammatically shows the actuating system of the present invention wherein a lever moves to a horizontal position when the liquid is completely filled in the reservoir tank.
Figure 3B:
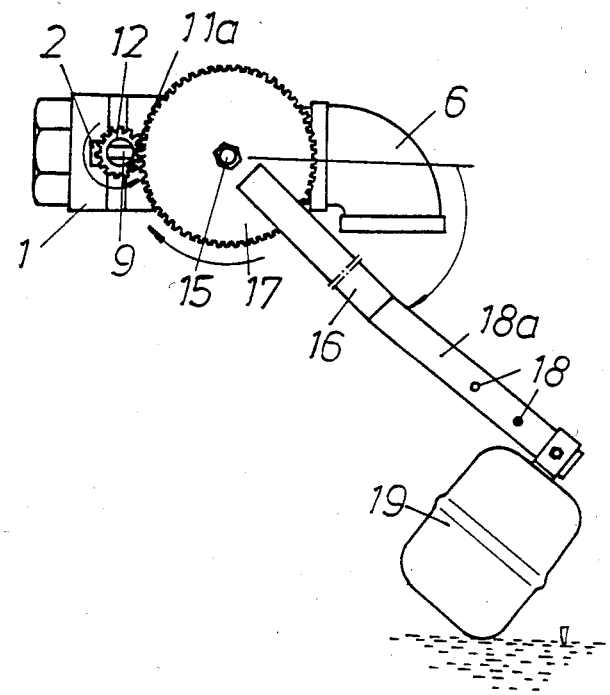
FIG. 3B diagrammatically shows the actuating system of the present invention wherein the lever is lowered as the fluid is drained and before the valve is in an opened position.
Figure 4A:
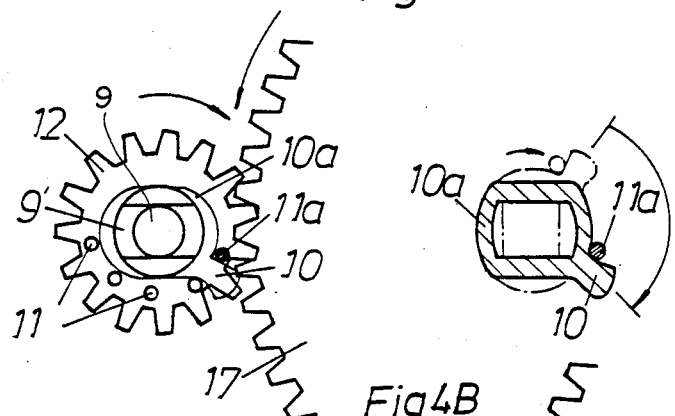
FIG. 4A diagrammatically shows the mechanical gear system of the present invention with the valve in a closed position.
Figure 4B:
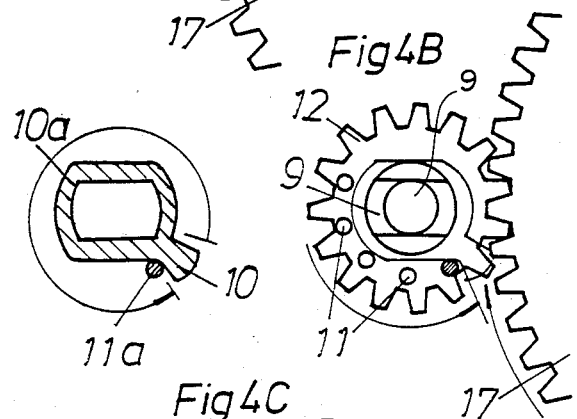
FIG. 4B diagrammatically shows the mechanical gear system of the present invention with the valve is in a position immediately before it opens.
Figure 4C:
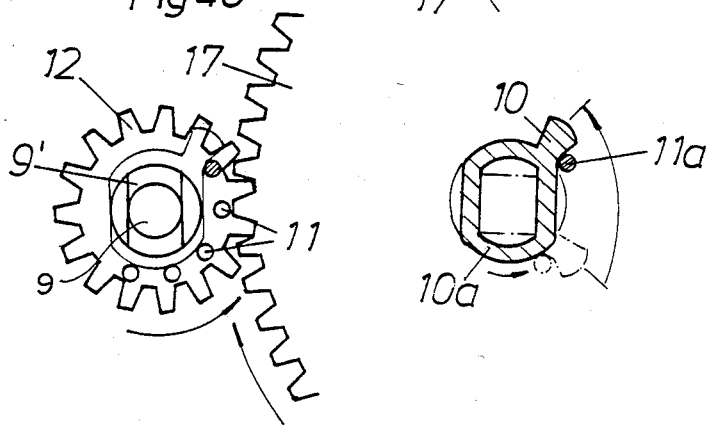
FIG. 4C diagrammatically shows the mechanical gear system of the present invention with the valve in an open position.
Figure 4D:
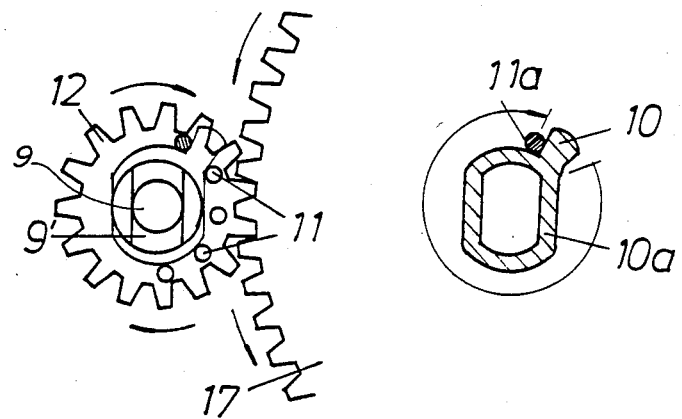
FIG. 4D diagrammatically shows the mechanical gear system of the present invention with the valve in a position before it opens.

Accordingly, the passive gear 12 stopped by the projecting nipple 10 disposed on the moving member 10a rotates almost one revolution and the fixed pin 11 disposed in the hole 11 provided in the passive gear is contacted by the projecting nipple member 10 (FIG. 4B). At this time the open/close valve 5a still closes. Thereoften, when the float ball 19 falls to the bottom of the reservoir (FIG. 3C), the fixed pin 11a forces the projecting member 10 to move in the upward direction. At this time the gear shaft 9 having the stud 9' inserted in the shaft inserting member 2 rotates 90' angle (FIG. 4C) and the open/close valve 5a opens to fill the liquid into the reservoir as shown FIG. 2B. When the level of liquid rises, as shown in FIG. 3D, the passive gear 12 rotates almost one revolution in the opposite direction (FIG. 4D). When the level of the liquid is horizontal (FIG. 3A), the fixed pin 11a forces the projecting member 10 to move downward as shown FIG. 4A and the open/close valve 5a closes to permit the liquid to flow into the reservoir (FIG. 2A). At this time, the sheet screw 3 can seal around the open/close valve 5a, the plurality of holes 11 disposed at the passive gear 12 can be used to adjust the relief angle to control the open/close valve 5a, and the plurity of adjusting holes 18 disposed at the ball tap lever 18a can be used to control the buoyancy of the float ball 19.

Figure 5C:
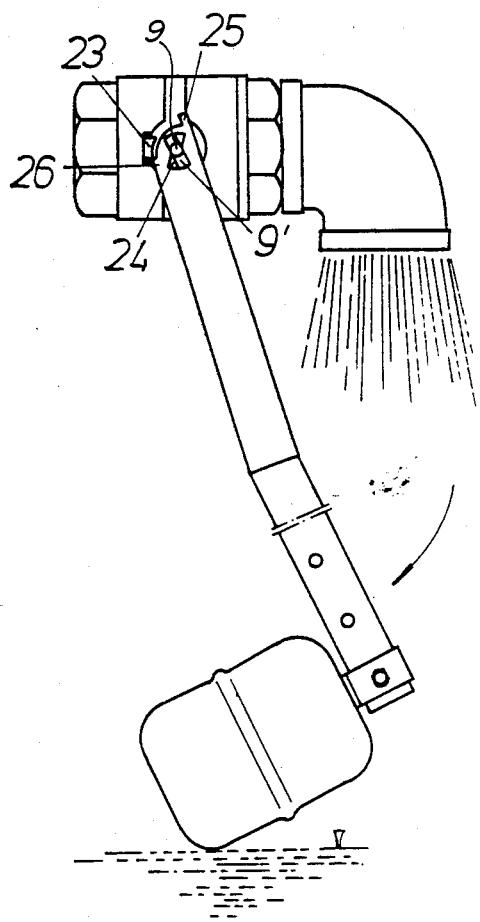
FIG. 5C diagrammatically shows the embodiment of FIG. 5A of the actuating system of the present invention wherein the lever is lowered as the liquid is completely drained and the valve is in an open position.
Figure 5E:
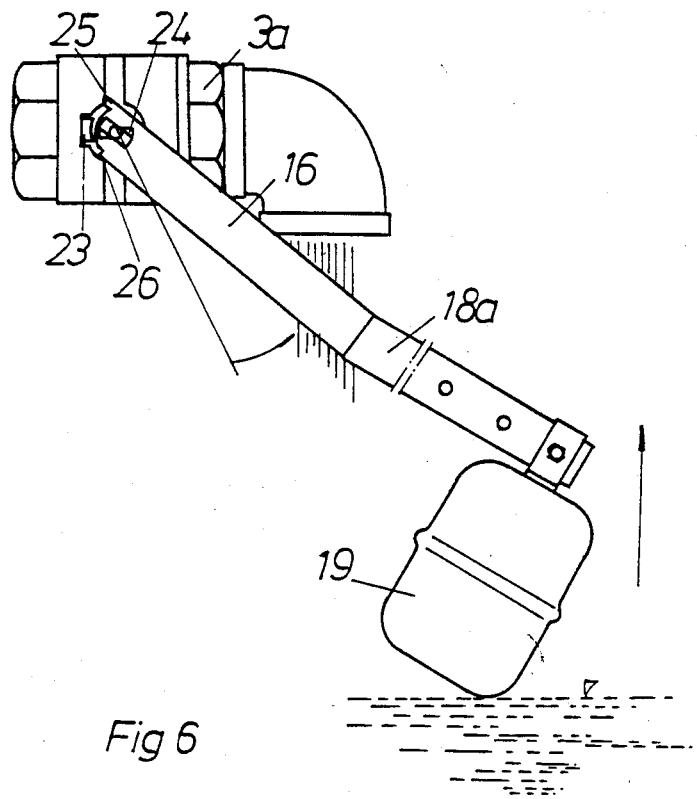
FIG. 5E diagrammatically shows another acting system of the present invention wherein the valve is closing as the liquid begins to fill in the reservoir tank.
Figure 6:
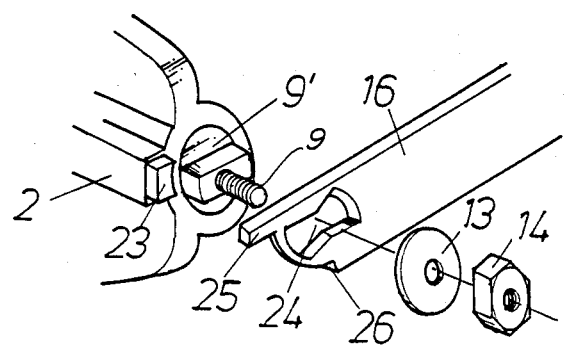
FIG. 6 is exploded perspective view of clearance portion of FIG. 5A of the present invention.
Figure 7D:
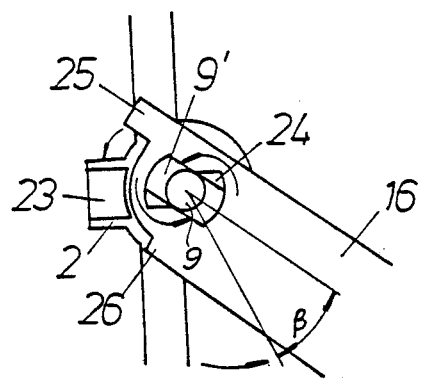
FIG. 7D diagrammatically shows the mechanical lever system of the present invention wherein the valve is still in an open position.
Figure 7E:
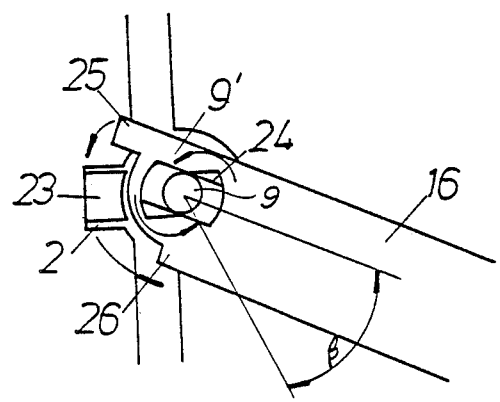
FIG. 7E diagrammatically shows the mechanical lever system of the present invention wherein the valve is closing.
Figure 8A:
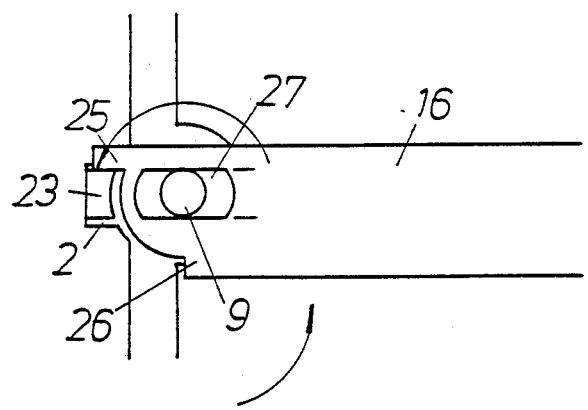
FIG. 8A diagrammatically shows the embodiment of the mechanical lever system of the present invention wherein the valve is in a close position.
Figure 8B:
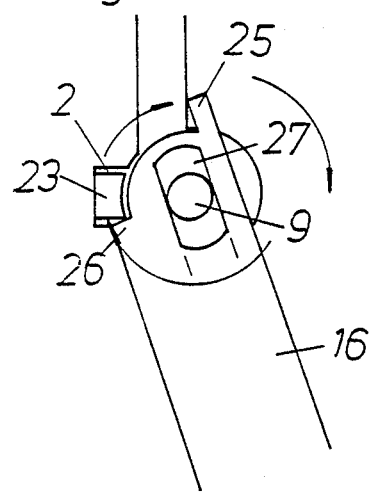
FIG. 8B diagrammatically shows the embodiment of mechanical lever system of the present invention wherein the valve is in a close position.
Figure 9A:
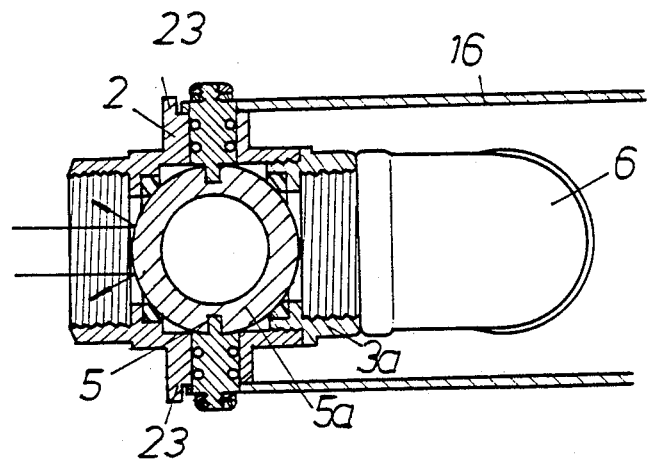
FIG. 9A is a sectional view of the embodiment of the float valve wherein the valve is in an open position.
Figure 9B:
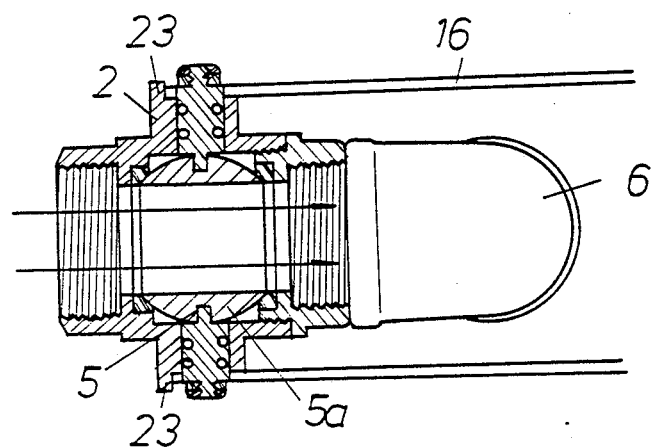
FIG. 9B is a sectional view of the embodiment of the float valve wherein the valve is in an open position.

Referring in detail to FIGS. 5A-5E, 6 and 7A-7E, there is illustrated the operation of one embodiment of the liquid level control float valve of the present invention. When the liquid fills the reservoir, the top raised portion 25 disposed at the end of the level 16 which includes the ⌒-shaped clearance hole 24 is stopped by the stud 23 and the open/close valve 5a closes the liquid flow. When the lever is lowered to a relief angle β from the regular level α, the open/close valve does not actuate (FIG. 5A-5B and 7A-7B). However, when the gear shaft 9 secured to the open/close valve 5a rotates an angle of approximately 70°-80° angle in the clockwise direction and the lower raised portion 26 is engaged by the stud 23, the open/close valve 5a opens (FIGS. 5C and 7C). When the lever 16 is raised up the relief angle β as supplying the fluid in the reservoir, the open/close valve 5a does not actuate (FIGS. 5D and 7D). When the top raised portion 25 is engaged by the stud 23, the open/close valve 5a closes completely from the position of the lever 16 as shown in FIGS. 5E and 7E to that of the lever 16 as shown FIGS. 5A and 7A.

Referring in detail to FIGS. 8A-8B and 9A-9B, there is illustrated the operation of the liquid level control float valve according to the present invention. The lever 16 includes the ⌐-shaped clearance hole 27 disposed at the end portion thereof and operates in the same manner as the ⌒-shaped clearance hole 24 described above.

Figure 10:
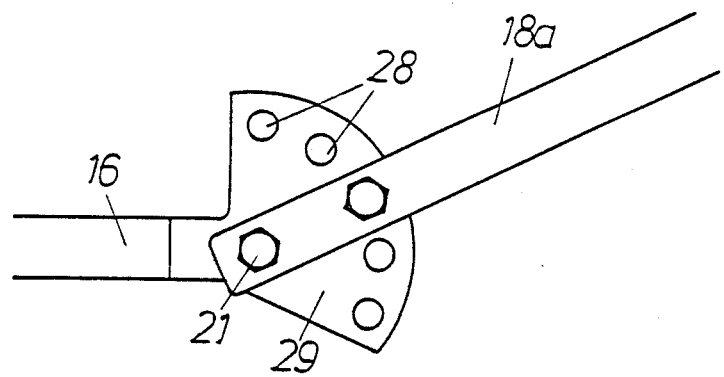
FIG. 10 is a front view of an angel control portion which is connected the lever to the float ball lever of the present invention.

Referring in detail to FIGS. 10 and 11, there is illustrated the operative and function of another embodiment of the liquid level control float valve in accordance with the present invention. The U-shaped lever 16 is provided with a fan-shaped plate 29 which contains a central hole 28a and a plurality of angled control holes 28 for adjusting the height of the float ball 19 according to the depth of the fluid reservoir.

Referring in detail to FIGS. 12, and 13A-13C, there is illustrated another embodiment of a liquid level control float valve assembly according to the present invention. If necessary, when the open/close valve 5a is to be closed at certain height level of the liquid, the height adjusting pin 33 and the adjusting holes 30 disposed in the vertical rod 31 can be used to adjust the degree of movement of the float ball along the vertical rod 31.

Figure 14A:
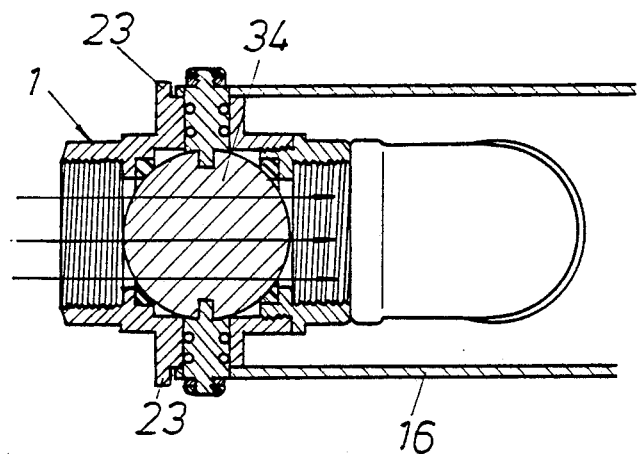
FIG. 14A is a sectional view of the valve showing the use of a disk attached to the ball and the valve is in an open position.
Figure 14B:
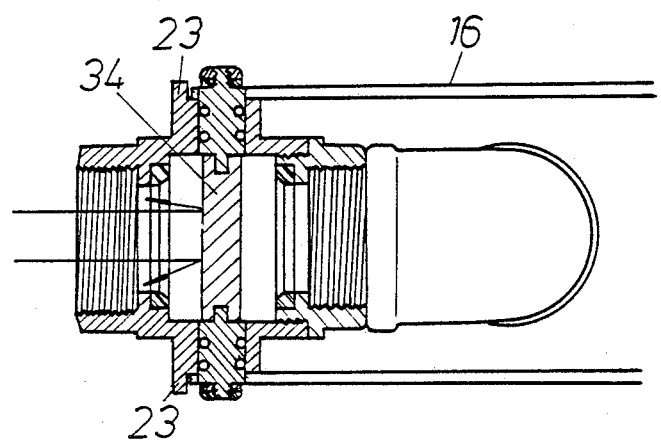
FIG. 14B is a sectional view of the valve showing the use of a disk attached to the ball and the valve is in a close position.
Figure 15A:
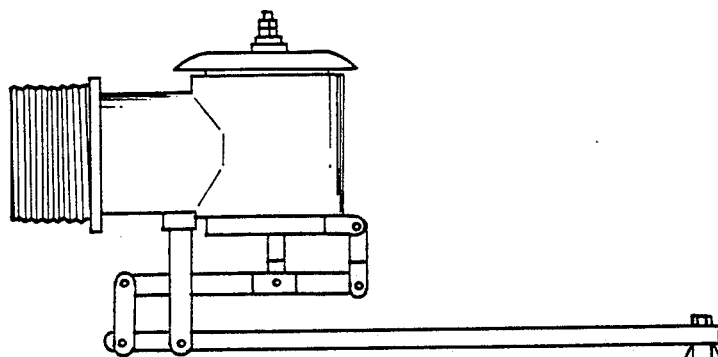
FIG. 15A is a front view of a prior art of the ball tap.
Figure 15B:
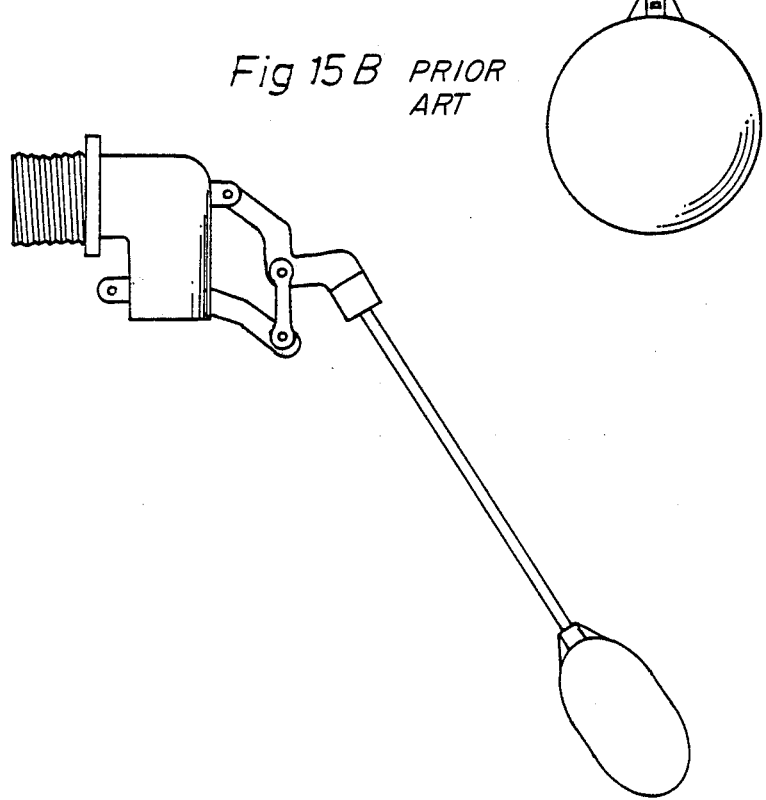
FIG. 15B is a front view of another prior art of the ball tap.

Referring in detail to FIG. 14A and 14B, there is illustrated the operation of a further embodiment of a liquid level control float valve according to the present invention. The open/close valve 5a can be changed to a disk 34 to open or close the liquid flow.

Figure 16:
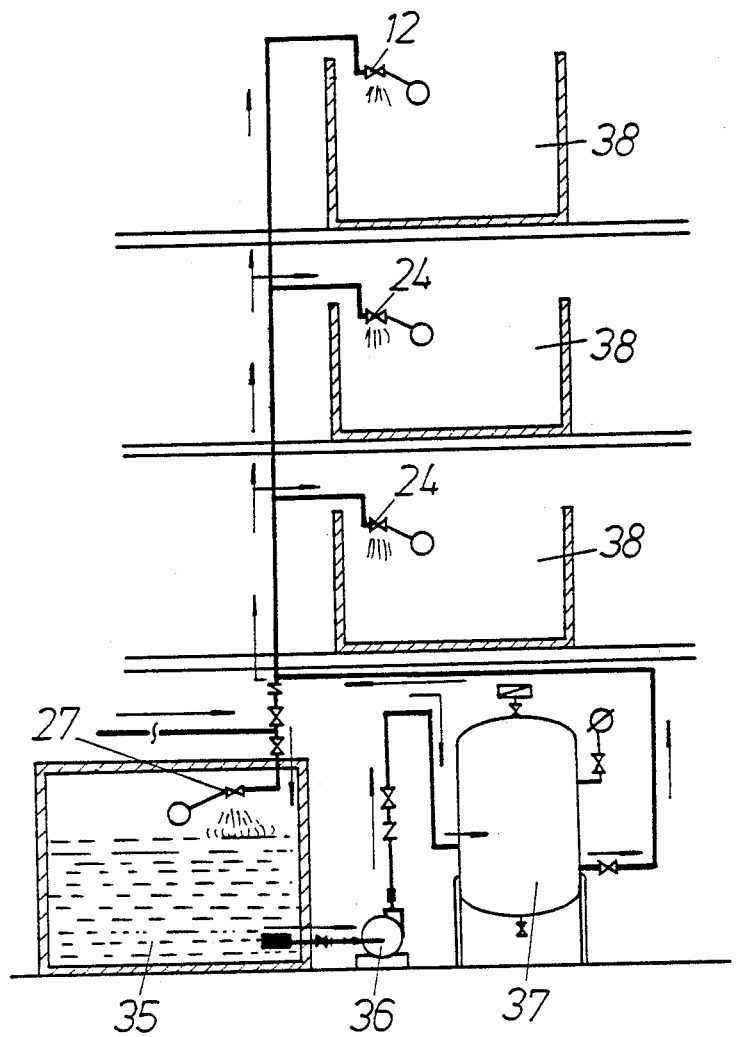
FIG. 16 diagrammatically shows the liquid level control float valve in operation.

FIG. 16 diagrammatically illustrates the use of the liquid level control float valve of the present invention in a facility. The liquid in a reservoir 35 installed underground can be supplied to small reservoirs 38 through a pressurized fluid tank by actuating a pump 37.

According to the present invention, since the open/close valve 5a or disk 34 does not open within a certain liquid level, the liquid level control float valve device of the present invention eliminates the disadvantages of the prior float valve devices such as fluid leakage, expensive cost for manufacturing, damage to the float ball, and the like.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed:

1. A liquid level control float valve which comprises:
   a valve body,
   an open/close valve disposed in said valve body, said open/close valve being mounted on a gear shaft which extends from the inside of said valve body to the outside of said valve body and on opposite sides thereof,
   engaging members fixed to the gear shaft on opposite sides of the valve body, said engaging members being provided with a projecting nipple,
   stud means disposed on the gear shaft at opposite sides of the valve body and the engaging members having a shape which substantially corresponds to the shape of the stud means whereby a secure engagement is achieved between the stud means and the engaging members,
   passive gears rotatably engaged with said gear shaft on opposite sides of said valve body and adapted to engage said engaging members after a selected portion of its rotation has taken place, said passive gear containing a plurality of holes for selectively receiving a pin, said pin being adapted to engage the projecting nipple of the engaging member for selectively and adjustably rotating the degree of opening and closing of the valve within the valve body,
   driving gears mounted for rotational engagement with said passive gears,
   a float ball provided to determine the liquid level, and
   lever arms connected at one end to said float ball and at the other end to said driving gears whereby upon the change in the level of the liquid, the float ball is raised or lowered which in turn rotates the driving gears and the passive gears engaged therewith which further rotates the engaging members upon the engagement of the pin against the projecting nipple of the engaging members for operating the gear shaft to operate the open/close valve.

2. The liquid level of claim 1 wherein the lever arms have a substantially U-shaped configuration for engagement at one end with said driving gears and at the other end to said float ball.

3. The liquid level of claim 2 wherein a fan-shaped plate is disposed between said lever arms and said float ball, said fan-shaped plate containing a plurality of holes for adjusting the mounting position of the float ball relative to the lever arms.

4. The liquid level of claim 1 wherein the lever arms contains a vertical portion and the float ball is slidably disposed on said vertical portion for movement along said vertical portion with the change in the liquid level and wherein means are provided on said vertical portion for limiting the vertical movement of the float ball therein.

5. A liquid level of claim 1 wherein the lever arms has a horizontal portion which contains a plurality of apertures whereby the portion of the float ball can be varied along the lever arm.

6. The liquid level of claim 1 wherein the open/close valve is a disk.

7. The liquid level control float valve which comprises:
   a valve body,
   an open/close valve disposed in said valve body, said open/close valve being mounted in a gear shaft which extends from the inside of said valve body to the outside of said valve body and on opposite sides thereof,
   first stud means fixed to the gear shaft on opposite sides of said valve body, said stud means having a specific configuration,
   lever arms disposed on opposite sides of said valve body, said lever arms connected at one end thereof to a float ball and provided at the other ends thereof with apertures for engagement with said first stud means, said apertures being configured to permit predetermined movement of the lever arms around said first stud means prior to the engagement of the first stud means with the respective side walls of said apertures, whereby the opening and closing of the valve is delayed and second stud means provided on the outside of said valve body and a top and lower raised portion disposed at the top and lower end portion of the lever arms for engaging with said second stud means for establishing the full open and close positions of the valve when said first stud means engages the respective side walls of said apertures.

8. The liquid level of claim 7 wherein another stud means is mounted on the valve body on opposite sides thereof and the lever arm is provided with a projecting member, said projecting member being adapted to engage said another stud means thereby limiting the opening and closing of the valve.

* * * * *